United States Patent
Xiong et al.

(10) Patent No.: US 10,665,263 B1
(45) Date of Patent: May 26, 2020

(54) DATA STORAGE DEVICE CONVERTING DISK SURFACE TO READ-ONLY

(71) Applicant: Western Digital Technologies, Inc., San Jose, CA (US)

(72) Inventors: Shaomin Xiong, Fremont, CA (US); Toshiki Hirano, San Jose, CA (US); Na Wang, San Jose, CA (US); William B. Boyle, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/271,840

(22) Filed: Feb. 10, 2019

(51) Int. Cl.
| G11B 11/105 | (2006.01) |
| G11B 21/10 | (2006.01) |
| G11B 5/012 | (2006.01) |
| G11B 5/00 | (2006.01) |
| G11B 21/04 | (2006.01) |

(52) U.S. Cl.
CPC .......... G11B 21/106 (2013.01); G11B 5/012 (2013.01); *G11B 21/04* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| 5,212,602 A * | 5/1993 | Suzuki | G06K 7/084 360/110 |
| 5,966,263 A * | 10/1999 | Freitas | G11B 25/043 360/31 |
| 6,879,454 B2 | 4/2005 | Winarski et al. | |
| 9,007,724 B1 * | 4/2015 | Furukawa | G11B 5/48 369/13.33 |
| 9,123,355 B1 * | 9/2015 | Dakroub | G11B 13/04 369/13.33 |
| 9,196,278 B1 * | 11/2015 | Tatah | G11B 5/4866 369/13.33 |
| 9,230,586 B1 * | 1/2016 | Ota | G11B 5/6011 369/13.33 |
| 9,558,774 B1 | 1/2017 | Macken | |
| 9,632,717 B2 | 4/2017 | Petruzzo et al. | |
| 10,026,420 B1 * | 7/2018 | Rausch | G11B 5/012 |
| 2005/0213436 A1 | 9/2005 | Ono et al. | |
| 2005/0231846 A1 * | 10/2005 | Winarski | G11B 20/00086 360/69 |
| 2012/0281310 A1 * | 11/2012 | Lim | G11B 5/5552 360/77.02 |
| 2012/0284467 A1 * | 11/2012 | Bish | G11B 5/00813 711/154 |
| 2013/0229895 A1 * | 9/2013 | Shiroishi | G11B 5/1278 369/13.14 |
| 2014/0104724 A1 * | 4/2014 | Shiroishi | G11B 5/66 360/75 |
| 2019/0347020 A1 * | 11/2019 | Allo | G06F 12/023 |
| 2019/0348070 A1 * | 11/2019 | Allo | G06F 21/78 |

\* cited by examiner

*Primary Examiner* — Tan X Dinh

(57) ABSTRACT

A data storage device is disclosed comprising a first head actuated over a first disk surface, wherein the first head comprises a write coil and a write-assist component. First data is written to the first disk surface using the write coil and the write-assist component of the first head. An electrical bias is applied to the write-assist component of the first head to physically damage the write-assist component, thereby rendering the first disk surface read-only.

11 Claims, 4 Drawing Sheets

DATA STORAGE DEVICE CONVERTING DISK SURFACE TO READ-ONLY

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator.

DETAILED DESCRIPTION

Figure 1:
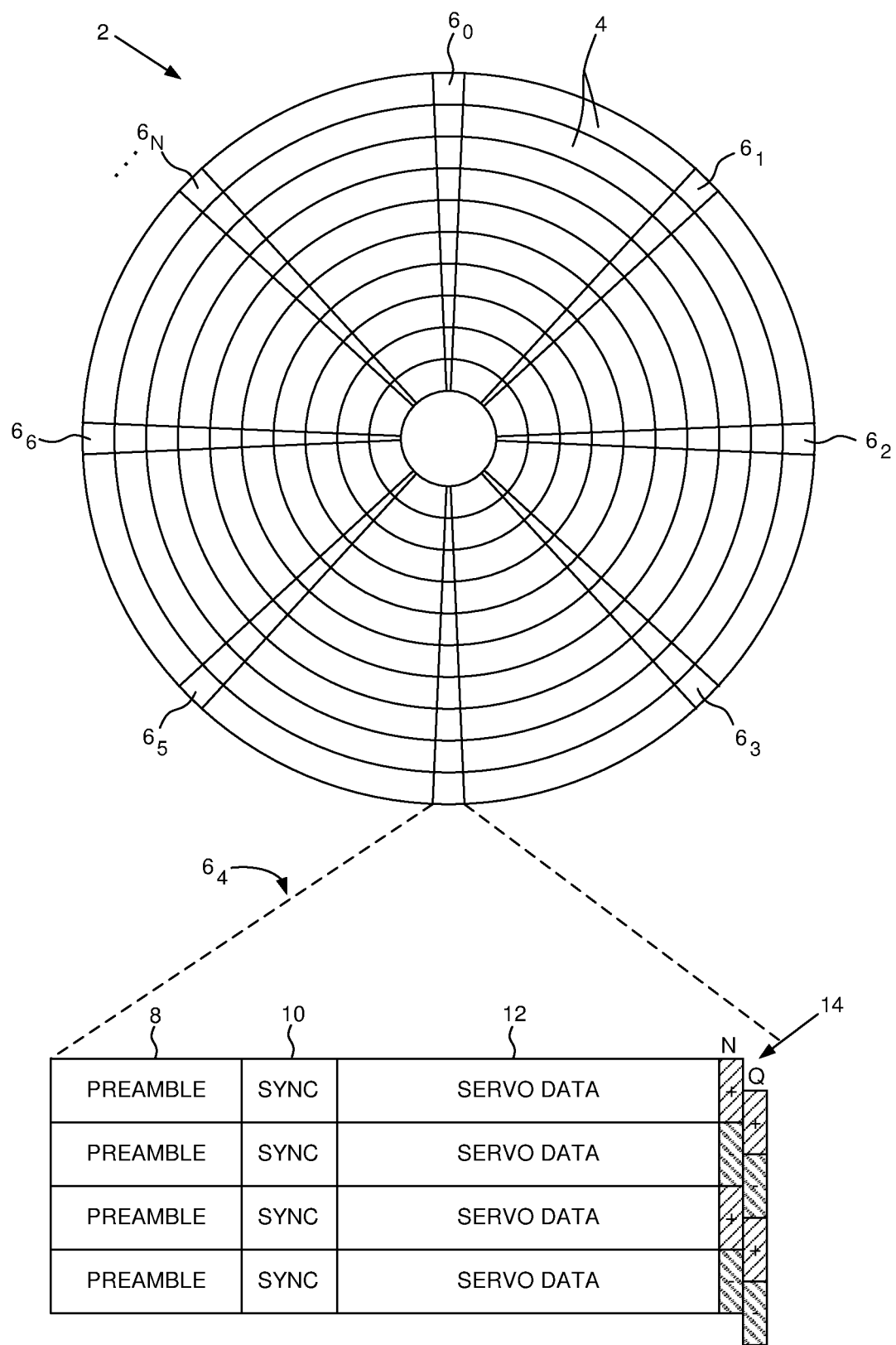
FIG. 1 shows a prior art disk format comprising a plurality of servo tracks defined by servo sectors.
Figure 2:
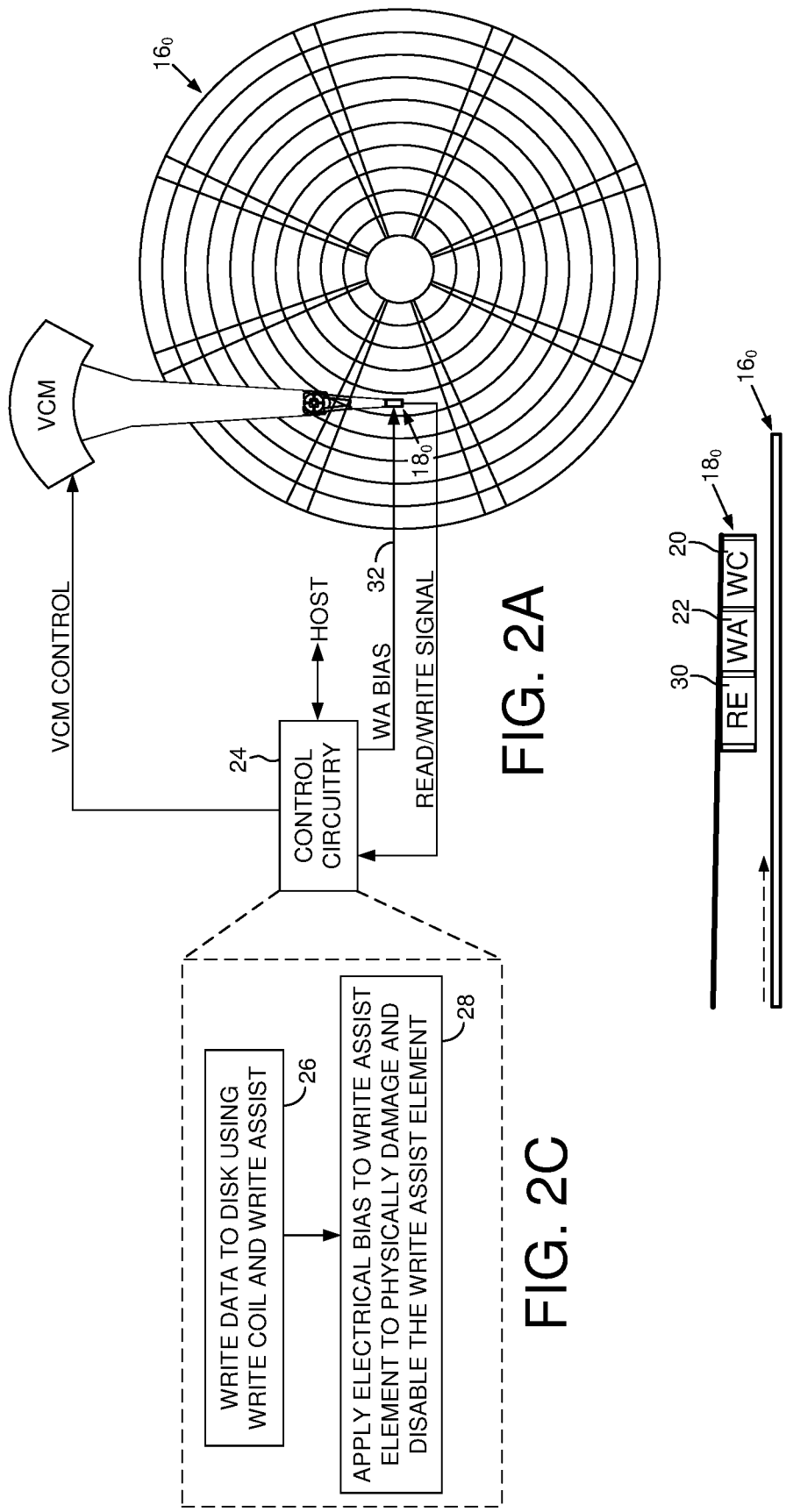
FIG. 2A shows a data storage device in the form of a disk drive according to an embodiment comprising a head actuated over a disk.
FIG. 2B shows an embodiment wherein the head comprises a write coil and a write-assist component.
FIG. 2C is a flow diagram according to an embodiment wherein after writing data to a disk surface, the disk surface is converted to read-only by applying an electrical bias to the write assist component to physically damage and disable the write assist component.

FIG. 2A shows a data storage device in the form of a disk drive according to an embodiment comprising a first disk surface $16_0$ and a first head $18_0$ actuated over the first disk surface $16_0$. FIG. 2B shows an embodiment wherein the first head $18_0$ comprises a write coil 20 and a write-assist component 22. The disk drive of FIG. 2A further comprises control circuitry 24 configured to execute the flow diagram of FIG. 2C, wherein first data is written to the first disk surface using the write coil and the write-assist component of the first head (block 26). An electrical bias (e.g., current or voltage) is applied to the write-assist component of the first head to physically damage the write-assist component, thereby rendering the first disk surface read-only (block 28).

In the embodiment of FIG. 2B, the first head $18_0$ may be fabricated in any suitable manner, such as by fabricating a number of write/read components on a slider using well known semiconductor fabrication techniques. In one embodiment, the first head $18_0$ may comprise a suitable read element 30, such as a magnetoresistive (MR) read element. In addition, the write assist component 22 may comprise any suitable component or components configured to assist the process of writing data to the disk surface. In an embodiment utilizing heat assisted magnetic recording (HAMR), the write assist component 22 may comprise a suitable laser and a suitable near field transducer (NFT). In an embodiment utilizing microwave assisted magnetic recording (MAMR), the write assist component 22 may comprise a suitable spin torque oscillator (STO) configured apply a high frequency auxiliary magnetic field to the media close to the resonant frequency of the magnetic grains, thereby enabling the magnetic field generated by the write coil to more readily magnetize the disk surface. In yet another embodiment, the write assist component 22 may comprise a suitable fly height actuator (FHA), such as a suitable thermo-expansive element or a suitable piezoelectric element, configured to actuate the fly height of the write coil 20 during write operations. In one embodiment, physically damaging the write assist component 22 renders the corresponding disk surface unwritable, including the inability to erase or corrupt the previously written data (i.e., the previously written data becomes read-only).

In one embodiment, the first disk surface is configured into a read-only surface by applying an electrical bias (e.g., current or voltage) to the write assist component 20 so as to physically damage the write assist component 20. For example, in one embodiment the write assist component 20 (e.g., laser, STO, FHA, etc.) may be biased by a bias signal 32 (e.g., bias current or bias voltage) during normal write operations. In one embodiment, applying an electrical bias to physically damage the write assist component 20 comprises increasing the amplitude of the bias signal 32 to a level that causes physical damage to the write assist component 20. For example, the amplitude of the bias signal 32 may be increased until the resulting power causes physical damage to the write assist component 20 due to thermal degradation. In another embodiment, the write assist component may be physically damaged by reversing the polarity of the bias signal 32. In one embodiment, a write assist component may be indirectly affected by the bias signal 32, and therefore physically damaged indirectly by the bias signal 32. For example in a HAMR embodiment, an NFT may be physically damaged by applying a sufficiently high power to the laser; that is, in one embodiment the high amplitude of the laser light may physically damage the NFT (or other write assist component).

In one embodiment, after converting a disk surface to read-only the control circuitry 24 may test that the write-assist component is truly disabled. For example, in one embodiment after disabling the write-assist component the control circuitry 24 may attempt a write/read operation to/from a reserved area of the disk surface to verify that the write assist component is truly disabled. In another embodiment, the control circuitry 24 may attempt to erase previously written data in a reserved area of the disk, for example, by applying a DC signal to the write coil while the head is over the previously written data. The control circuitry 24 may then verify that the previously written data is still readable, thereby verifying that the write assist component has been truly disabled.

Figure 3:
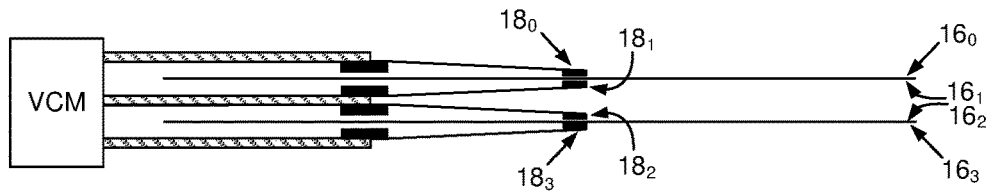
FIG. 3 shows a disk drive according to an embodiment comprises multiple disk surfaces and a respective head actuated over each disk surface.

The write assist component may be physically damaged in order to convert a disk surface into a read-only surface for any suitable reason. In one embodiment it may be desirable to convert certain files to read-only, for example, in applications where tamper resistance is of significant concern (e.g., government documents, military documents, legal documents, etc.). In an embodiment shown in FIG. 3, the disk drive may comprise a plurality of disk surfaces $16_0$-$16_3$ and a plurality of heads $18_0$-$18_3$ each actuated over a respective disk surface. In one embodiment, the disk surfaces $16_0$-$16_3$ may be written consecutively (e.g., from the outer diameter toward the inner diameter), wherein when one of the disk surfaces becomes full of data, the disk surface may be converted to read-only by damaging the write assist component of the corresponding head, and then writing new data to the next disk surface.

Figure 4:
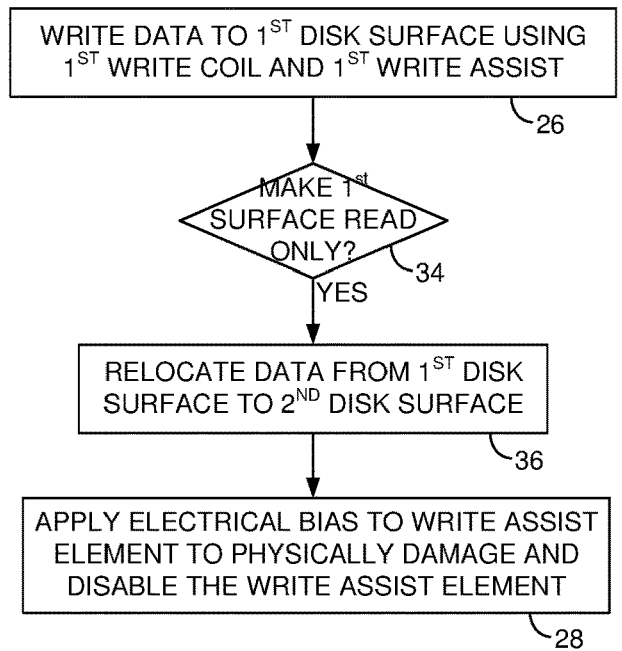
FIG. 4 is a flow diagram according to an embodiment wherein prior to converting a first disk surface to read-only, data is relocated from the first disk surface to a second disk surface.
Figure 6:
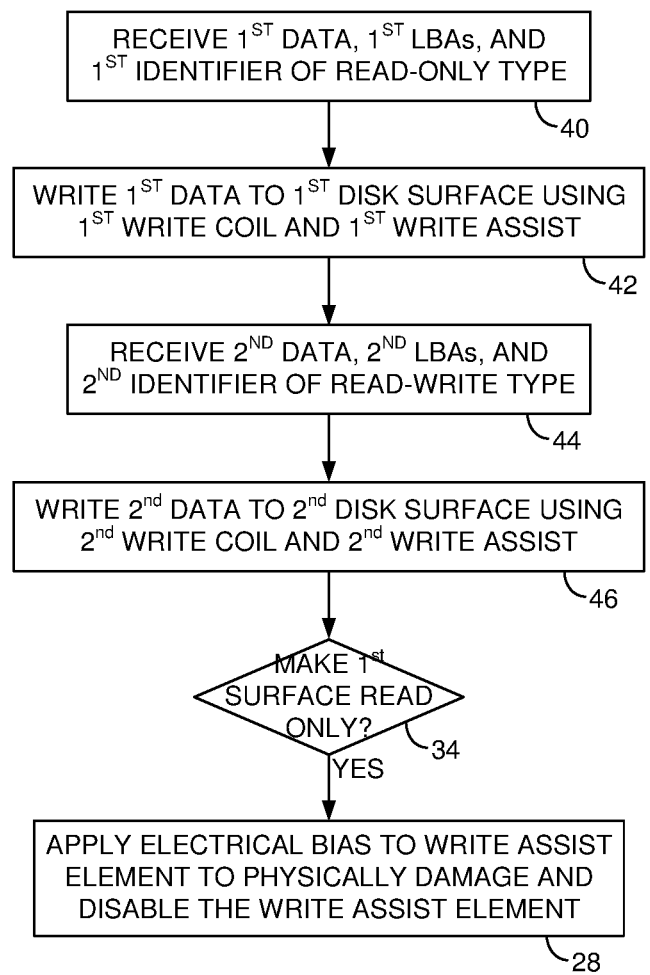
FIG. 6 is a flow diagram according to an embodiment wherein first data received from a host is written to a first disk surface when the first disk surface is to be converted to read-only, and second data received from the host is written to a second disk surface when the second disk surface is to remain read-write.

FIG. 4 is a flow diagram according to an embodiment which is an extension of the flow diagram of FIG. 2C. In this embodiment, when a first disk surface is to be converted to read-only (block 34), at least some of the data recorded on the first disk surface is relocated to a second disk surface (block 36). For example, in one embodiment the first disk surface may comprise one or more files (system or host files) that should not be converted to read-only, such as a log file used to maintain the mapping information for the data recorded on the disk surfaces (e.g., logical block address (LBA) to physical block address (PBA) mapping). In an embodiment described below with reference to FIG. 6, the LBAs of some files received from a host may be designated by the host as read-only, whereas the LBAs of other files may be designated by the host as read-write. Accordingly in one embodiment before converting a disk surface into a read-only surface the LBAs of read-write host files may be relocated to a different disk surface.

Figure 5:
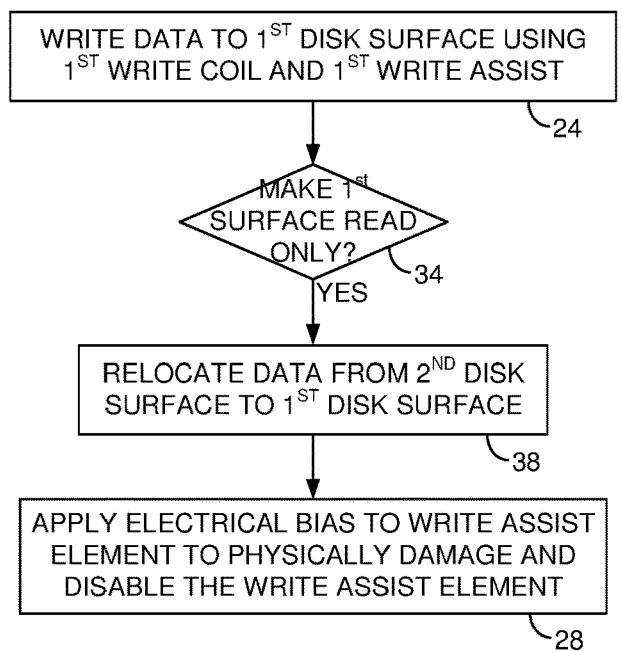
FIG. 5 is a flow diagram according to an embodiment wherein prior to converting a first disk surface to read-only, data is relocated from a second disk surface to the first disk surface.

FIG. 5 is a flow diagram according to an embodiment which is an extension of the flow diagram of FIG. 2C. In this embodiment, when a first disk surface is to be converted to read-only (block 34), at least some of the data recorded on a second disk surface is relocated to the first disk surface (block 38). For example, in one embodiment the second disk surface may store one or more files that have been designated as read-only (e.g., disk drive system or host files). Before converting the first disk surface to read-only, one or more of the read-only files on the second disk surface may be relocated to the first disk surface so as to fill up the first disk surface and thereby maximize the capacity of the disk drive.

In another embodiment, the control circuitry 24 may monitor the access frequency of LBAs mapped to the different disk surfaces. Over time, an LBA may be designated by the control circuitry as read-only since it may be written one time and thereafter never overwritten. In other words, the control circuitry 24 may assume that an LBA written one time and never overwritten is part of a read-only file received from the host. An example of a read-only file may be a video file which is typically written one time by the host and never overwritten. In one embodiment when a first disk surface is to be converted into a read-only surface, the LBAs designated as read-only may be relocated to the first disk surface from other disk surfaces, and/or the LBAs designated as read-write may be relocated from the first disk surface to another disk surface. In this manner, the first disk surface may be substantially filled with data prior to converting it to read-only, thereby maximizing the capacity of the disk drive.

In one embodiment, the host may send a command to the control circuitry 24 to convert at least part of the disk drive to read-only. For example, in one embodiment the host may consider the files written to the disk drive as read-only. In this embodiment, the host may write multiple files (or a single large file) to the disk drive, and then send a command to the control circuitry 24 to convert all of the data written so far into read-only data. In response to receiving the command, the control circuitry 24 may convert one or more of the disk surfaces to read-only, including to relocate data between the disk surfaces as needed. In one embodiment, the host may write additional files to the disk drive after converting the previously written files to read-only, wherein the new files may eventually be converted to read-only by sending another command to the control circuitry 24.

In one embodiment, when the host sends a write command to the control circuitry 24 the write command includes logical block addresses (LBAs) for the data as well as an identifier which identifies the LBAs as read-write or read-only. In this embodiment, the control circuitry 24 may then map the LBAs to physical block addresses (PBAs) of respective disk surfaces based on the LBA identifier. For example, the control circuitry 24 may reserve a first disk surface for storing read-only LBAs and a second disk surface for storing read-write LBAs. At some point in time, such as when the first disk becomes full of data or a convert command is received from the host, the control circuitry 24 converts the first disk surface to read-only, for example, by applying an electrical bias that physically damage a write assist component of the first head. An example of this embodiment is shown in the flow diagram of FIG. 6 which is executed by the control circuitry 24. First data and first LBAs are received from the host as part of a first write command that also includes a first identifier that identifies the first LBAs as read-only (block 40). In response to the first identifier, the control circuitry writes the first data to a first disk surface (block 42) since the first disk surface is reserved for writing read-only data. Second data and second LBAs are received from the host as part of a second write command that also includes a second identifier that identifies the second LBAs as read-write (block 44). In response to the second identifier, the control circuitry writes the second data to a second disk surface (block 42) since the second disk surface is reserved for writing read-write data. At some point in time a decision is made to convert the data stored on the first disk surface to read-only (block 34), for example, by applying an electrical bias to physically damage a write assist component of the first head (block 28).

In one embodiment, the control circuitry 24 may designate a disk surface as convertible to read-only based on a detected degradation of one or more write components in the corresponding head. For example, the control circuitry 24 may detect that a laser is degrading in a HAMR embodiment, or an STO is degrading in a MAMR embodiment. In one embodiment when a degrading head is detected, the control circuitry may migrate the read-only data to the corresponding disk surface as well as migrate the read-write data away from the corresponding disk surface as described above. Eventually a decision may be made to convert the corresponding disk surface to read-only as described above, in which case the degrading write components of the head are no longer an issue.

In some embodiments described above such as the embodiment of FIG. 6, a disk surface may be converted to read-only in ways other than physically damaging a write assist component of the head. For example, in one embodiment a disk surface may be converted to read-only by configuring the control circuitry 24 so that data may no longer be written to the disk surface. Configuring the control circuitry 24 may include configuring a computer program executed by a microprocessor (e.g., setting a flag), or it may include configuring a physical component, such as blowing a fuse or blowing (or otherwise disabling) a write amplifier or any other suitable write circuitry. In another embodiment, a disk surface may be converted to read-only by blowing a "fuse" along the transmission lines coupling the heads to the control circuitry 24. In yet another embodiment, a disk surface may be converted to read-only by reconfiguring the write components of the head, for example, by blowing a "fuse" within a slider in order disable one or more write components. In still another embodiment, a disk surface may be converted to read-only by programming a suitable programmable read-only memory (PROM) wherein in one embodiment the PROM is a one-time programmable memory.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface;
   a first head actuated over the first disk surface, wherein the first head comprises a write coil;
   a second disk surface;
   a second head actuated over the second disk surface; and
   control circuitry configured to:
   write first data to the first disk surface using the write coil of the first head;
   in response to a host command received from a host to render the first disk surface read-only, relocate at least some of the first data to the second disk surface and render the first disk surface read-only;
   receive from the host the first data, first logical block addresses (LBAs) assigned to the first data, and a first identifier indicating the first LBAs are of a read-only type;
   receive from the host second data, second logical block addresses (LBAs) assigned to the second data, and a second identifier indicating the second LBAs are of a read-write type;
   in response to the first identifier, write the first data to first physical block addresses (PBAs) assigned to the first disk surface, wherein the first LBAs are mapped to the first PBAs; and
   in response to the second identifier, write the second data to second PBAs assigned to the second disk surface, wherein the second LBAs are mapped to the second PBAs.

2. The data storage device as recited in claim 1, wherein in response to the host command to render the first disk surface read-only, the control circuitry is further configured to relocate second data from the second disk surface to the first disk surface.

3. The data storage device as recited in claim 2, wherein the control circuitry is further configured to:
   receive from the host the second data and logical block addresses (LBAs) assigned to the second data;
   write the second data to physical block addresses (PBAs) assigned to the second disk surface, wherein the LBAs are mapped to the PBAs; and
   in response to receiving the host command, relocate the second data by:
     remapping the LBAs to PBAs assigned to the first disk surface; and
     rewriting the second data to the PBAs assigned to the first disk surface.

4. A data storage device comprising:
   a first disk surface;
   a first head actuated over the first disk surface;
   a second disk surface;
   a second head actuated over the second disk surface; and
   control circuitry configured to:
   receive from a host first data, first logical block addresses (LBAs) assigned to the first data, and a first identifier indicating the first LBAs are of a read-only type;
   receive from the host second data, second logical block addresses (LBAs) assigned to the second data, and a second identifier indicating the second LBAs are of a read-write type;
   in response to the first identifier, write the first data to first physical block addresses (PBAs) assigned to the first disk surface, wherein the first LBAs are mapped to the first PBAs;
   in response to the second identifier, write the second data to second PBAs assigned to the second disk surface, wherein the second LBAs are mapped to the second PBAs; and
   after writing the second data to the second disk surface, render the first disk surface read-only.

5. The data storage device as recited in claim 4, wherein the first head comprises a write coil and a write-assist component and the control circuitry is further configured to render the first disk surface read-only by applying an electrical bias to the write-assist component of the first head to physically damage the write-assist component.

6. The data storage device as recited in claim 5, wherein the write-assist component of the first head comprises a laser.

7. The data storage device as recited in claim 5, wherein the write-assist component of the first head comprises a spin torque oscillator.

8. The data storage device as recited in claim 4, wherein the control circuitry is further configured to:
   receive a command from the host to render the first LBAs read-only; and
   in response to receiving the command, render the first disk surface read-only.

9. The data storage device as recited in claim 4, wherein the control circuitry is further configured to render the first disk surface read-only when an amount of free space on the first disk surface decreases to a threshold.

10. A data storage device comprising:
    a first disk surface;
    a first head actuated over the first disk surface, wherein the first head comprises a write coil;
    a second disk surface;
    a second head actuated over the second disk surface; and
    control circuitry configured to:
    write first data to the first disk surface using the write coil of the first head;
    in response to a host command received from a host to render the first disk surface read-only, relocate second data from the second disk surface to the first disk surface and render the first disk surface read-only;
    receive from the host the first data, first logical block addresses (LBAs) assigned to the first data, and a first identifier indicating the first LBAs are of a read-only type; and
    in response to the first identifier, write the first data to first physical block addresses (PBAs) assigned to the first disk surface, wherein the first LBAs are mapped to the first PBAs.

11. The data storage device as recited in claim 10, wherein the control circuitry is further configured to:
    receive from the host the second data and logical block addresses (LBAs) assigned to the second data;
    write the second data to physical block addresses (PBAs) assigned to the second disk surface, wherein the LBAs are mapped to the PBAs; and
    in response to receiving the host command, relocate the second data by:
      remapping the LBAs to PBAs assigned to the first disk surface; and rewriting the second data to the PBAs assigned to the first disk surface.

* * * * *